(12) United States Patent
Dutta et al.

(10) Patent No.: US 11,025,295 B2
(45) Date of Patent: Jun. 1, 2021

(54) OPTIMIZING MRC COEFFICIENTS FOR RAKE RECEIVER FOR INCREASING SNR

(71) Applicant: NXP B.V., Eindhoven (NL)

(72) Inventors: Amit Kumar Dutta, Bangalore (IN); Radha Srinivasan, Irvine, CA (US); Mohammad Areef, Bangalore (IN)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 16/594,557

(22) Filed: Oct. 7, 2019

(65) Prior Publication Data

US 2020/0127701 A1    Apr. 23, 2020

(30) Foreign Application Priority Data

Oct. 23, 2018    (EP) .................................. 18202079

(51) Int. Cl.
  *H04B 1/712*  (2011.01)
  *H04B 7/06*   (2006.01)
  *H04L 1/20*   (2006.01)
  *H04L 25/02*  (2006.01)

(52) U.S. Cl.
  CPC ........... *H04B 1/712* (2013.01); *H04B 7/0634* (2013.01); *H04L 1/203* (2013.01); *H04L 25/0214* (2013.01)

(58) Field of Classification Search
  CPC ..... H04J 11/0063; H04B 2201/709712; H04B 7/0845; H04B 1/7115; H04B 7/0634; H04B 7/02; H04B 1/712; H04L 1/203; H04L 25/0214
  See application file for complete search history.

(56) References Cited

U.S. PATENT DOCUMENTS

| | | | | |
|---|---|---|---|---|
| 6,996,160 B2 * | 2/2006 | Li | ........................ | H04B 1/712 375/148 |
| 7,167,455 B2 * | 1/2007 | Kondo | ................... | H04B 1/707 370/320 |
| 7,170,924 B2 * | 1/2007 | Corbaton | ............... | H04B 1/712 375/148 |

(Continued)

FOREIGN PATENT DOCUMENTS

| EP | 1617611 A2 | 1/2006 |
|---|---|---|
| EP | 1929648 B1 | 6/2008 |

OTHER PUBLICATIONS

"MISO Concepts for frequency-selective channels"; Irmer et al.; published in IEEE 2002 (Year: 2002).*

(Continued)

*Primary Examiner* — Benjamin H Elliott, IV

(57) ABSTRACT

There is described a method of determining an MRC coefficient vector for a RAKE receiver. The method comprises (a) estimating a channel impulse response vector, (b) estimating a noise variance vector, (c) calculating a multiplication factor vector based on the estimated channel impulse response vector and the estimated noise variance vector, (d) calculating a modified channel impulse response vector by multiplying each element in the estimated channel response vector with a corresponding element in the multiplication factor vector, and (e) calculating the MRC coefficient vector as the complex conjugate of the modified channel impulse response vector. There is also described a corresponding device, an UWB receiver, a computer program and a computer program product.

6 Claims, 2 Drawing Sheets

(56) References Cited

U.S. PATENT DOCUMENTS

| | | | | |
|---|---|---|---|---|
| 7,428,262 | B2* | 9/2008 | Zancho | H04L 25/0228 375/130 |
| 7,676,000 | B2* | 3/2010 | Garg | H04B 1/7115 375/340 |
| 10,129,862 | B1* | 11/2018 | Wu | H04B 17/318 |
| 2002/0080863 | A1* | 6/2002 | Nielsen | H04B 1/7115 375/152 |
| 2002/0176489 | A1* | 11/2002 | Sriram | H04B 1/7085 375/150 |
| 2003/0021246 | A1* | 1/2003 | Ling | H04B 1/7115 370/334 |
| 2003/0081658 | A1* | 5/2003 | Messier | H04L 1/0045 375/147 |
| 2004/0125865 | A1* | 7/2004 | Frank | H04B 1/712 375/148 |
| 2004/0146094 | A1* | 7/2004 | Kong | H04B 1/712 375/148 |
| 2005/0053172 | A1* | 3/2005 | Heikkila | H04B 7/0891 375/333 |
| 2006/0013326 | A1* | 1/2006 | Yoshida | H04L 25/0218 375/260 |
| 2006/0072654 | A1* | 4/2006 | Nielsen | H04B 1/7115 375/148 |
| 2007/0177658 | A1* | 8/2007 | Mehrabani | H04B 1/7115 375/148 |
| 2009/0323778 | A1* | 12/2009 | Woodard | H04B 1/7117 375/148 |
| 2010/0232555 | A1* | 9/2010 | Karagiannidis | H04B 7/084 375/347 |
| 2011/0128994 | A1* | 6/2011 | Beaulieu | H04B 1/719 375/138 |
| 2011/0201297 | A1* | 8/2011 | Adler | H04B 7/0868 455/334 |
| 2012/0328059 | A1* | 12/2012 | Balraj | H04L 25/061 375/346 |
| 2020/0127701 | A1* | 4/2020 | Dutta | H04B 7/0634 |

OTHER PUBLICATIONS

"Adaptive Windowed Statistical Selection Rake for Long Ultra-Wideband Multipath Channels"; Chung et al.; published Aug. 16, 2017 (Year: 2017).*

Bhushan, Naga et al. "Maximal Ratio Combining (MRC) in 1xEV-DO Link-level Simulations;" C30-DOAH-20030616-006; Jun. 16, 2003.

Nikolai, Dirk et al.; "Noncoherent RAKE-Receiver with Optimum Weighted Combining and Improved Closed-Loop Power Control;" Proceedings of ISSSTA '95 International Symposium on Spread Spectrum Techniques and Applications; Sep. 25, 1996; Mainz, Germany; DOI: 10.1109/ISSSTA.1996.563778.

Zhou, Lei et al.; "Weighted Rake Receiver for UWB Communications with Channel Estimation Errors;" 2005 International Conference on Communications, Circuits and Systems; May 27-30, 2005; Hong Kong, China; DOI: 10.1109/ICCCAS.2005.1493444.

* cited by examiner

US 11,025,295 B2

OPTIMIZING MRC COEFFICIENTS FOR RAKE RECEIVER FOR INCREASING SNR

CROSS-REFERENCE TO RELATED APPLICATIONS

This application claims priority under 35 U.S.C. § 119 to European Patent Application No. 18202079.2, filed on Oct. 23, 2018, the contents of which are incorporated by reference herein.

FIELD OF THE INVENTION

The present invention relates to the field of RAKE receivers, in particular to a method and device for determining maximal ratio combiner (MRC) coefficients for a RAKE receiver. Furthermore, the present invention relates to a corresponding computer program and computer program product.

ART BACKGROUND

For UWB (ultra wide band) transceivers based on the IEEE 802.15.4a standard, a RAKE receiver is a good linear option to optimally combine the CIR (channel impulse response) with the received data such that the receiver obtains a combined signal which ensures a maximum SNR (signal to noise ratio). This is because a RAKE receiver uses the MRC (maximal ratio combiner) principle to coherently combine the CIR (or "fingers") along with the received data, which theoretically maximizes the received SNR. It is a well-known fact that the larger the received SNR is, the better the packet-error-ratio (PER) or bit-error-ratio (BER) performance will be.

If h is a CIR vector, then the linear coefficients that maximize the received SNR are obtained as the complex conjugate h* of the channel vector h. However, it is a fundamental problem that the exact CIR vector h is not known at the receiver. Instead, an estimated value (which may be denoted $\hat{h}$) of the actual channel can be obtained. Hence, the theoretical SNR maximization cannot be obtained by using the estimated channel vector $\hat{h}$ instead of the actual channel vector h. Instead, a suboptimal solution will be obtained.

On a side note, if n is the channel estimation error, the complex conjugate of h+n would be the actual (i.e. estimated) solution. Unfortunately, n is not known in a practical receiver.

Therefore, multiplying the received signal vector with the complex conjugate of $\hat{h}$ (i.e. the estimated channel or CIR) will not maximize the received SNR.

Accordingly, there may be a need for a way of alleviating this sub-optimality of the SNR and improving the PER performance, in particular in a way that is practically useful in the framework of an IEEE 802.15.4a UWB transceiver, i.e. without overly complex processing or additional hardware.

SUMMARY OF THE INVENTION

This need may be met by the subject matter according to the independent claims. Advantageous embodiments of the present invention are set forth in the dependent claims.

According to a first aspect there is provided a method of determining an MRC coefficient vector for a RAKE receiver. The method comprises (a) estimating a channel impulse response vector, (b) estimating a noise variance vector, (c) calculating a multiplication factor vector based on the estimated channel impulse response vector and the estimated noise variance vector, (d) calculating a modified channel impulse response vector by multiplying each element in the estimated channel response vector with a corresponding element in the multiplication factor vector, and (e) calculating the MRC coefficient vector as the complex conjugate of the modified channel impulse response vector.

This aspect is based on the idea that the elements in an estimated channel impulse response (CIR) vector, i.e. estimated CIR taps or fingers, are modified by multiplication with individual correction factors in order to be closer to the true CIR vector. The multiplication factors are obtained from the estimated CIR and estimated noise variance, i.e. from estimates that most receivers are able to provide. Thus, the calculation of the improved MRC coefficients can be easily implemented in a receiver, e.g. in an ASIC, as it merely requires calculation of the multiplication factors and calculation of the modified CIR vector by simple multiplication.

According to an embodiment, the method further comprises (a) calculating a squared modulus of each element in the estimated channel impulse response vector, and (b) in the step of calculating the modified channel impulse response vector, multiplying an element in the estimated channel response vector with the corresponding element in the multiplication factor vector only if the squared modulus of that element in the estimated channel response vector exceeds a predetermined threshold value.

In other words, if the squared modulus of an element in the estimated channel impulse response vector does not exceed the predetermined threshold value, then this particular element is not modified by multiplication with the corresponding element in the multiplication factor vector. Instead, the particular element in the estimated channel impulse response vector is left without modification. Thereby, small or even absent values in the estimated channel impulse response vector are not modified.

According to a further embodiment, an i-th element $k_i$ of the multiplication factor vector is calculated as $$k_i = \sqrt{K\left[1 + \frac{\hat{\sigma}_i^2}{|\hat{h}_i|^2}\right]},$$

where $\hat{\sigma}_i^2$ is the i-th element of the estimated noise variance vector, $\hat{h}_i$ is the i-th element of the estimated channel impulse response vector, and K is a predetermined scalar value.

According to a further embodiment, the predetermined scalar value K is between 0.3 and 0.5, in particular equal to 0.4.

Experiments have shown that values in this range provide the best SNR improvement in a RAKE receiver.

According to a second aspect, there is provided a device for determining an MRC coefficient vector for a RAKE receiver. The device comprises (a) a first input for receiving an estimated channel impulse response vector, (b) a second input for receiving an estimated noise variance vector, and (c) a calculation unit adapted to (i) calculate a multiplication factor vector based on an estimated channel impulse response vector received at the first input and an estimated noise variance vector received at the second input, (ii) calculate a modified channel impulse response vector by multiplying each element in the estimated channel response vector with a corresponding element in the multiplication factor vector, and (iii) calculate the MRC coefficient vector as the complex conjugate of the modified channel impulse response vector.

The device according to the second aspect is essentially based on the same idea as the method according to the first aspect discussed above.

According to a third aspect, there is provided an UWB receiver, in particular an IEEE 802.15a based UWB receiver, comprising (a) a RAKE receiver, (b) a channel estimation unit for estimating a channel impulse response vector, (c) a noise variance estimating unit for estimating a noise variance vector, and (d) a device according to the second aspect, wherein the first input of the device is coupled to the channel estimation unit, wherein the second input of the device is coupled to the noise variance estimating unit, and wherein the device is coupled and adapted to provide a MRC coefficient vector to the RAKE receiver.

According to a fourth aspect, there is provided a computer program comprising computer executable instructions which, when executed by a computer, causes the computer to perform the steps of the method according to the first aspect.

According to a fifth aspect, there is provided a computer program product comprising a computer readable data carrier loaded with a computer program according to the fourth aspect.

It should be noted that embodiments of the invention have been described with reference to different subject matters. In particular, some embodiments have been described with reference to method type claims whereas other embodiments have been described with reference to apparatus type claims. However, a person skilled in the art will gather from the above and the following description that, unless otherwise indicated, in addition to any combination of features belonging to one type of subject matter also any combination of features relating to different subject matters, in particular a combination of features of the method type claims and features of the apparatus type claims, is also disclosed with this document.

The aspects defined above and further aspects of the present invention will be apparent from the examples of embodiment to be described hereinafter and are explained with reference to the examples of embodiment. The invention will be described in more detail hereinafter with reference to examples of embodiment to which the invention is, however, not limited.

DETAILED DESCRIPTION

Figure 1:
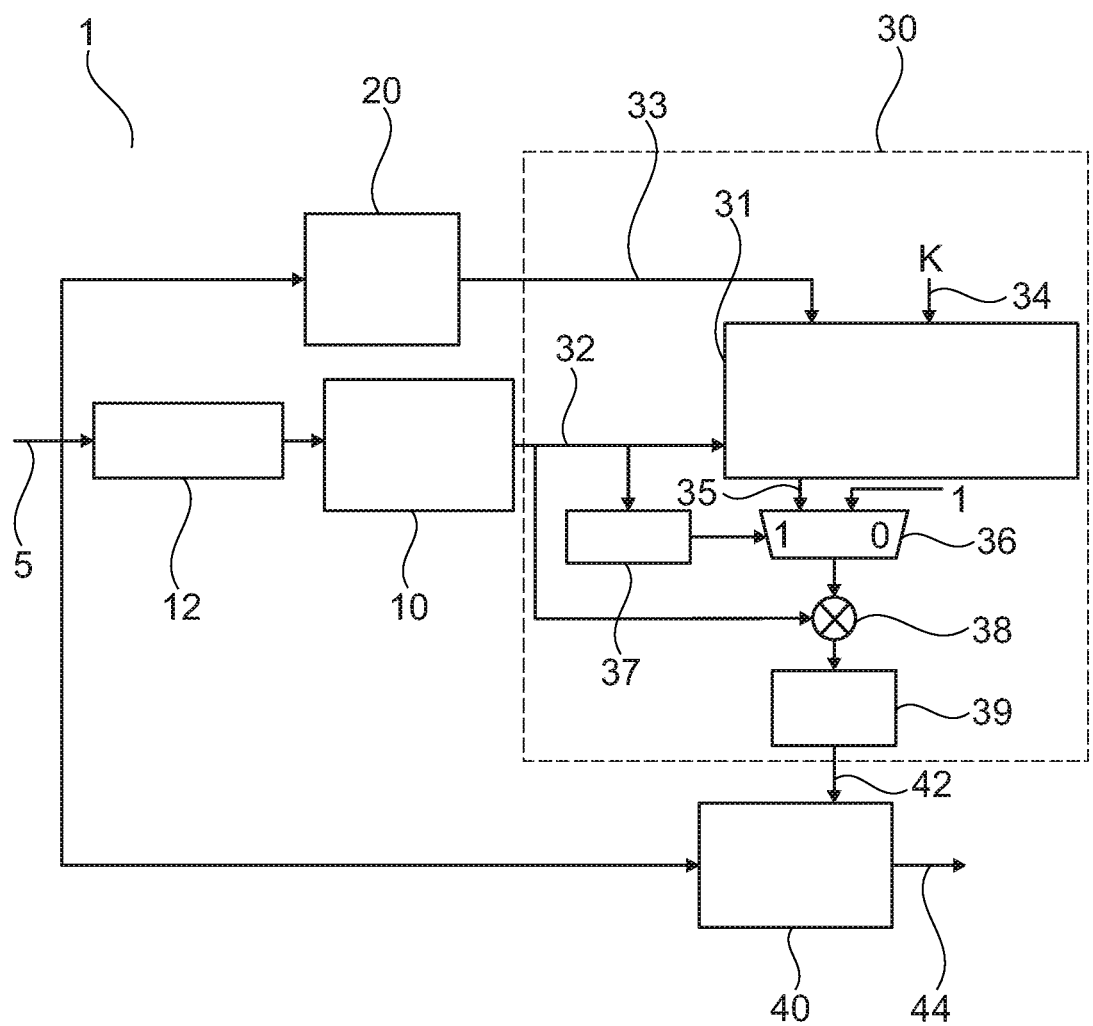
FIG. 1 shows an UWB receiver in accordance with an embodiment.

The illustration in the drawing is schematic. It is noted that in different figures, similar or identical elements are provided with the same reference signs or with reference signs, which differ only within the first digit.

FIG. 1 shows an UWB receiver 1 in accordance with an embodiment. More specifically, the receiver 1 comprises a data signal input 5, a channel estimation unit 10, a correlator 12, a noise variance estimating unit 20, a device 30 for determining MRC coefficients, and a RAKE receiver 40 having an MRC input 42 and a receiver output 44. The device 30 comprises a processing unit 31 coupled to receive an estimated channel impulse response vector 32 from the channel estimation unit 10, an estimated noise variance vector 33 from the noise variance estimating unit 20, and a predetermined scalar value K at input 34. The processing unit 31 is adapted to calculate multiplication factors (or a multiplication factor vector) based on the estimated channel impulse response vector 32, the estimated noise variance vector 33, and the predetermined scalar value K as follows:

$$k_i = \sqrt{K\left[1 + \frac{\hat{\sigma}_i^2}{|\hat{h}_i|^2}\right]},$$

where $k_i$ is the i-th element of the multiplication factor vector, $\hat{\sigma}_i^2$ is the i-th element of the estimated noise variance vector 33, and $\hat{h}_i$ is the i-th element of the estimated channel impulse response vector 32. The scalar value K is between 0.3 and 0.5, preferably equal to 0.4

The multiplication factors 35 are supplied to an input of a multiplexer 36. The multiplexer is controlled by an output from comparator unit 37. The comparator unit 37 is adapted to compare the squared modulus of each element $\hat{h}_i$ in the estimated channel impulse response vector 32 with a predetermined threshold value. If for a given element (i.e. a given value of i), the squared modulus exceeds the threshold value, the comparator unit 37 controls the multiplexer 36 to let the corresponding multiplication factor through to multiplier 38. If the squared modulus is below or equal to the threshold value, the multiplexer 36 is instead controlled to let a factor 1 through to the multiplier 38. Thereby, each element in the estimated channel impulse response vector 32 is multiplied with either a corresponding multiplication factor as calculated by the processing unit 31 or by a factor 1. This results in a modified channel impulse response vector which is supplied to conjugation unit 39. The conjugation unit 39 calculates the MRC coefficients as the complex conjugate of the modified channel impulse response vector and supplies them (as a vector) to the MRC input 42 of RAKE receiver 40.

As shown in FIG. 1 and discussed above, the present invention relies on a multiplication of the traditional MRC coefficients with a certain factor. Each MRC coefficient is multiplied with an individual factor. The variation in factor evaluation comes from the fact that each factor depends on individual channel tap and the estimated noise variance. It also requires another adjustable constant K, which is derived experimentally. It has been found that K can lie in [0.3 0.5] across any channel model. Further, it has also been found that a K value of 0.4 works very well for most cases while any other value within the range [0.3 0.5] will not degrade the performance much.

The present invention, in particular the embodiment shown in FIG. 1, has been derived by maximizing the received SINR (signal to interference plus noise ratio). The interference arises due to the channel estimation noise, which is propagated to the MRC coefficients. The solution becomes closed form if BPSK (binary phase shift key) modulation is adopted as signal constellation, i.e. all real, which is the case in the IEEE 802.15.4a standard.

Figure 2:
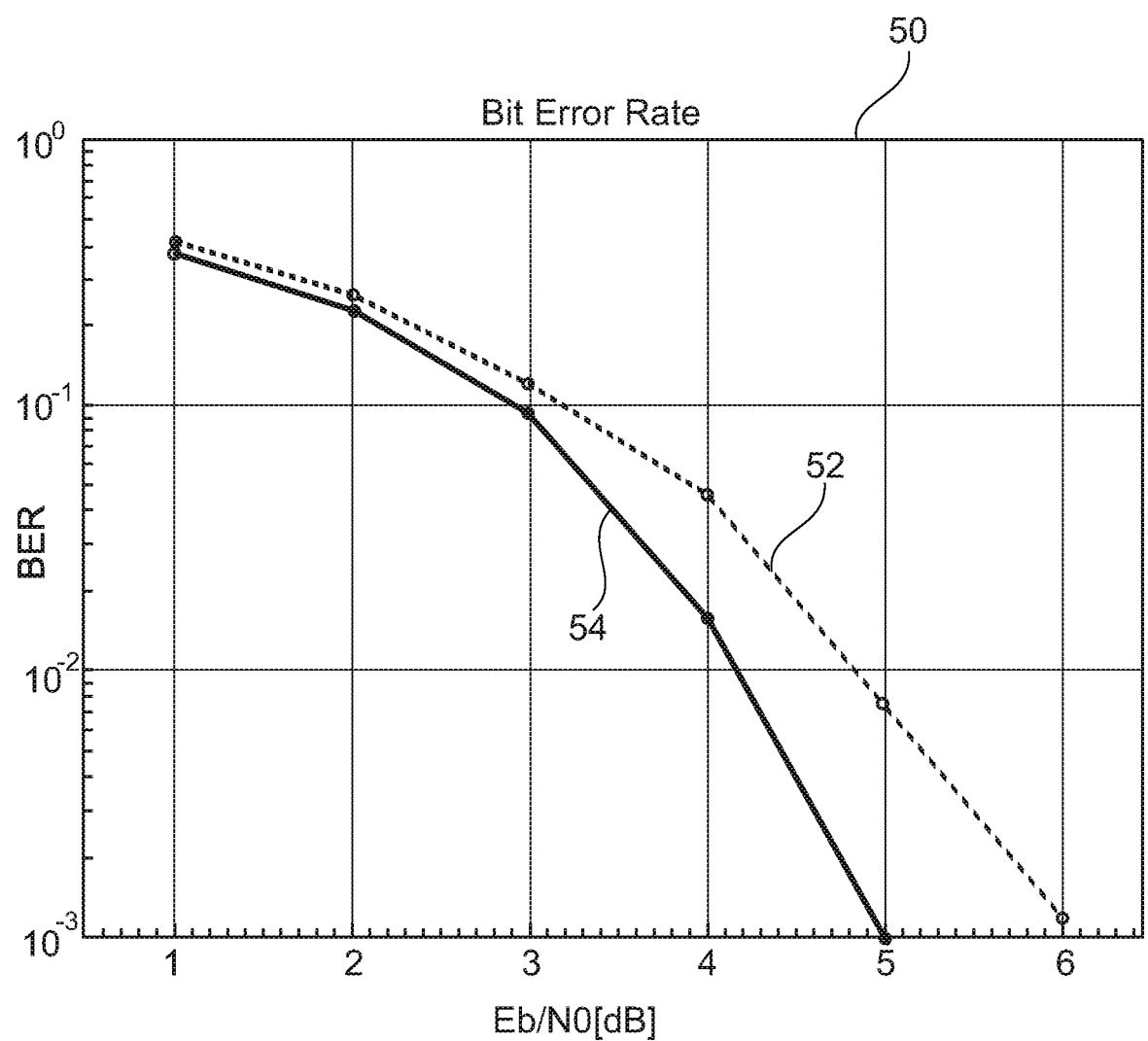
FIG. 2 shows a comparison of bit error rate performance in a conventional receiver and a receiver according to an embodiment.

FIG. 2 shows a comparison of bit error rate (BER) performance in a conventional receiver and a receiver according to an embodiment. More specifically, the plot 50 shows the dependency between BER and Eb/N0 (normalized SNR per bit) for a conventional RAKE receiver (curve 52), where the MRC coefficients are obtained directly from the estimated CIR, and for a RAKE receiver (curve 54) utilizing the method of determining the MRC coefficients of the present invention. As can be seen, the latter provides a lower BER for any value of Eb/N0.

More specifically, FIG. 2 shows a simulation on a UWB modem MATLAB model based on the IEEE 802.15.4a standard, which deploys BPM-BPSK (burst per modulation-BPSK) signal sets. The chosen system is a single-input single-output (SISO) system. The channel is chosen as multi-path with all its complex coefficients having Rayleigh or Rician (Only NLOS component) distribution. More precisely, a channel model of Residential NLOS type was chosen. The total number of frames is 2000. As can be seen from the curves 52 and 54, the method according to the present invention provides an SNR gain of almost 1 dB for a BER of 1.0e-3.

It is noted that, unless otherwise indicated, the use of terms such as "upper", "lower", "left", and "right" refers solely to the orientation of the corresponding drawing.

It is noted that the term "comprising" does not exclude other elements or steps and that the use of the articles "a" or "an" does not exclude a plurality. Also elements described in association with different embodiments may be combined. It should also be noted that reference signs in the claims should not be construed as limiting the scope of the claims.

The invention claimed is:

1. A method of determining an Maximal Ratio Combiner (MRC) coefficient vector for a RAKE receiver, the method comprising
estimating a channel impulse response vector,
estimating a noise variance vector,
calculating a multiplication factor vector based on the estimated channel impulse response vector and the estimated noise variance vector,
calculating a squared modulus of each element in the estimated channel impulse response vector;
calculating a modified channel impulse response vector by multiplying each element in the estimated channel response vector with a corresponding element in the multiplication factor vector only if the squared modulus of that element in the estimated channel response vector exceeds a predetermined threshold value, and
calculating the MRC coefficient vector as the complex conjugate of the modified channel impulse response vector.

2. The method according to claim 1, wherein an i-th element $k_i$ of the multiplication factor vector is calculated as $$k_i = \sqrt{K\left[1 + \frac{\hat{\sigma}_i^2}{|\hat{h}_i|^2}\right]},$$

where $\hat{\sigma}_i^2$ is the i-th element of the estimated noise variance vector, $\hat{h}_i$ is the i-th element of the estimated channel impulse response vector, and K is a predetermined scalar value.

3. The method according to claim 2, wherein the predetermined scalar value K is between 0.3 and 0.5.

4. The method of claim 1, wherein a computer program stored in a non-transitory computer readable medium comprising computer executable instructions which, when executed by a computer, causes the computer to perform the steps of the method.

5. An integrated circuit device for determining an Maximal Ratio Combiner (MRC) coefficient vector for a RAKE receiver, the device comprising
a first input for receiving an estimated channel impulse response vector,
a second input for receiving an estimated noise variance vector, and
a calculation circuit adapted to
calculate a multiplication factor vector based on an estimated channel impulse response vector received at the first input and an estimated noise variance vector received at the second input,
calculate a squared modulus of each element in the estimated channel impulse response vector;
calculate a modified channel impulse response vector by multiplying each element in the estimated channel response vector with a corresponding element in the multiplication factor vector only if the squared modulus of that element in the estimated channel response vector exceeds a predetermined threshold value, and
calculate the MRC coefficient vector as the complex conjugate of the modified channel impulse response vector.

6. The integrated circuit device of claim 5 further comprising
a channel estimation circuit for estimating a channel impulse response vector,
a noise variance estimating circuit for estimating a noise variance vector, and
wherein the first input of the device is coupled to the channel estimation circuit, wherein the second input of the device is coupled to the noise variance estimating circuit, and wherein the device is coupled and adapted to provide a MRC coefficient vector to the RAKE receiver.

* * * * *